March 17, 1964 J. F. BRUMBACH 3,125,639

RECORDING DEVICES

Filed Sept. 12, 1960 2 Sheets-Sheet 1

INVENTOR.
JOSEPH F. BRUMBACH
BY
Wallace, Kinzer and Dorn
Att'ys.

RECORDING DEVICES

Filed Sept. 12, 1960 2 Sheets-Sheet 2

INVENTOR.
JOSEPH F. BRUMBACH
BY
Wallace, Kinzer and Dorn
ATT'YS.

United States Patent Office 3,125,639

Patented Mar. 17, 1964

3,125,639
RECORDING DEVICES

Joseph F. Brumbach, Niles, Ill., assignor, by mesne assignments, to Victor Comptometer Corporation, Chicago, Ill., a corporation of Illinois Filed Sept. 12, 1960, Ser. No. 55,516
12 Claims. (Cl. 178—19)

This invention relates to a new and improved signalling and control system for a graphic communication system receiver and more particularly to a system for controlling special functions of the receiver in response to the presence or absence of received data signals.

In a graphic communication system, data comprising handwriting, sketches, or the like are recorded at a transmitter station and are simultaneously recorded in essentially the same form at a remote receiver station. In a communication system of this kind, it is frequently desirable to connect a given transmitter to a plurality of receiver stations in order to transmit data to different locations. On the other hand, it may be desirable to transmit data from the transmitter to only one receiver station, despite the fact that two or more stations may normally be connected to the same system in the transmitter. Furthermore, it may be desirable to leave a receiver continuously connected to the transmission system, particularly where the receiver is not subject to continuous surveillance by an operator. If this is done, however, it is necessary to protect the receiver against undesirable operation which might be caused by the presence of extraneous signals in the transmission system. Of course, it is possible to perform these control functions in response to separate control signals transmitted independently through the communication system and utilized to actuate suitable control devices at the receiver station. On the other hand, the use of such separate function control signals may add substantially to the complexity of the communication system, particularly where virtually the entire capacity of the system would normally be utilized for data signal transmission.

It is an object of the present invention, therefore, to provide a new and improved signalling and control system for a graphic communication receiver which is responsive to received data signals and which is effective to initiate operation of the receiver automatically without requiring a separate control signal.

Another object of the invention is to utilize a received data signal to actuate a receiver, in a graphic communication system, and permit continuous connection of the receiver to a transmission system without engendering spurious operation of the receiver in response to noise and other signals on the line.

A further object of the invention is to provide for selective actuation of individual receivers, in a graphic communication system including at least two receivers, in response to transmission of data signals which normally control the recording operations of the receiver.

Another object of the invention is to perform a variety of different control functions, in the receiver of a graphic communication system, in response to conventional data signals.

A particular object of the invention is to utilize the differences in push-pull and push-push operating characteristics of balanced discriminators and other balanced operating circuits for signalling purposes in a graphic communication system.

An additional object of the invention is to provide a new and improved signalling and control system for a graphic communication system which is simple and economical in construction, yet highly effective and accurate in operation.

Accordingly, the present invention relates to a signalling and control system for a receiver in a graphic communication system of the kind in which coordinate graphic reproduction data are transmitted as a modulated signal of given frequency. In the preferred embodiment of the invention, the data are transmitted by a pair of frequency-modulated signals within two distinct frequency ranges. The control system comprises detector means including a balanced operating circuit, the detector means being effective to develop a data control signal in the form of push-pull signal variations relative to the electrical center of the balanced circuit. The potential at the center point in the balanced circuit, however, remains substantially unchanged in the presence of a received signal regardless of amplitude changes in the push-pull signal output of the circuit. The system further includes a control device which is connected to the electrical center point of the balanced circuit and is actuatable between a first operating condition and a second operating condition in response to changes in the potential of the electrical center point caused by the presence and absence, respectively, of one of the transmitted data signals. The control device is employed to prevent operation of the receiver whenever that device is in a selected operating condition.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1:
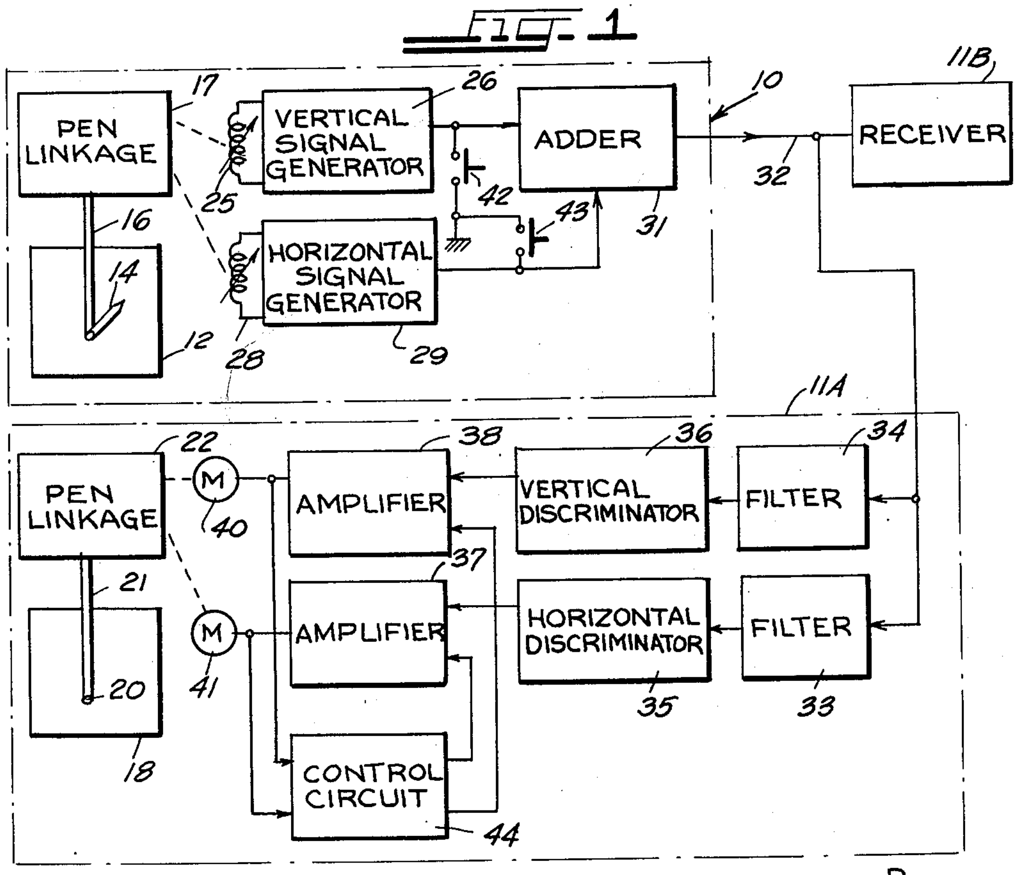
FIG. 1 is a simplified block diagram, partly schematic, of a graphic communication system in which the present invention may be incorporated.

The graphic communication system illustrated in FIG. 1 comprises a transmitting station 10 and a pair of receiving stations 11A and 11B. In a typical system, each of the units 10, 11A and 11B may be a transceiver adapted to function as either a transmitter or a receiver. In order to simplify the description of the invention, however, it is assumed herein that unit 10 functions as the transmitter and that each of the devices 11A and 11B constitutes a receiver. The receivers 11A and 11B may be essentially similar to each other except as noted hereinafter.

The transmitter 10 includes a writing surface 12, upon which a sheet of paper or other suitable recording medium may be supported. A pen-like recording stylus 14 is supported above the writing surface 12 and may be moved into and out of engagement with the writing surface 12. Stylus 14 is supported by a link 16 which comprises a part of a pen linkage 17. The pen 14 may be guided into and out of contact with the paper on the surface 12 and may also be moved across the paper, as desired, to write or to form an image on the paper.

The receiver 11A is in many respects essentially similar in construction to the transmitter 10. It includes a writing surface 18 having a sheet of paper or other suitable recording medium supported thereon. The receiver further includes a recording stylus 20 supported upon an arm or link 21 which constitutes a part of the receiver recording linkage or pantograph 22. A similar recording apparatus is incorporated in the receiver 11B.

The transmitter pen linkage 17 is connected to a variable impedance 25 which may comprise a variable capacitor or a variable inductor as illustrated. The inductor 25 is electrically connected to and forms a part of a first data signal generator 26, herein designated as the "vertical" signal generator. Similarly, the linkage 17 is mechanically connected to a variable inductor 28 which comprises a part of a second coordinate signal generator 29, the "horizontal" signal generator. It should be understood that signal transmission need not be based on rectilinear coordinates, but is dependent upon the apparatus employed in the pen linkage 17. The output stages of the two coordinate signal circuits 26 and 29 are coupled to each other and to a suitable adder 31 which comprises the output circuit of the transmitter 10. The circuit 31 is connected to a suitable transmission link, here shown as a transmission line 32. The line 32 is connected to the two receivers 11A and 11B.

In the receiver 11A, the line 32 is electrically coupled to two filter circuits 33 and 34, which in turn are coupled, respectively, to two detector or discriminator circuits 35 and 36. The discriminators 35 and 36 are individually connected to a pair of amplifiers 37 and 38, respectively. The vertical control circuit or amplifier 38 is electrically coupled to a motor or other suitable actuating device 40 which in turn is mechanically connected to the receiver pen linkage 22. Similarly, in the horizontal coordinate circuit, the amplifier 37 is coupled to a second motor 41 which is also mechanically connected to the linkage 22.

The communication system illustrated in FIG. 1, as thus far described, is essentially similar in construction and operation to the system described and claimed in Patent No. 2,583,720, issued January 29, 1952, to Robert Adler, and the linkage systems 17 and 22 may be of the kind described in detail and claimed in Patent No. 2,583,535, to Robert Adler, issued January 29, 1952. Accordingly, only a relatively brief description of the operation of the system is necessary herein.

Movement of the transmitter stylus 14 along the "vertical" or "Y" axis illustrated in FIG. 1 results in a corresponding movement of the variable element of the inductor or other variable impedance device 25. Consequently, this movement of the stylus may be utilized to vary the frequency or amplitude of a coordinate data signal of given fundamental frequency generated in the circuit 26. Similarly, movement of the transmitter stylus 14 along the "horizontal" or "X" axis can be employed to vary the frequency or amplitude of a second coordinate data signal generated in the circuit 29. The two modulated coordinate data signals are preferably of different fundamental frequency, and thus may be transmitted to the receiver along the line 32, or along some other suitable transmission line, without substantial loss of intelligence. The received signals are effectively segregated, by frequency, in the filters 33 and 34 and are applied to the two discriminators 35 and 36, respectively. In the discriminators, the data signals are effectively detected and are utilized to generate data control signals which are applied to the amplifiers 37 and 38, each of which may include one or more stages of amplification. The output signals from the amplifiers 37 and 38 are applied to the control motors 41 and 40, respectively, to drive the pen linkage 22 and to move the stylus 20 across the writing surface 18 in synchronism with movement of the stylus 14 across the transmitter writing surface 12. Accordingly, the receiver stylus 20 traces a path on the surface 18 similar to that traced by the transmitter stylus upon the surface 12. Preferably, each of the motors 40 and 41 is connected in a servo loop to afford accurate and effective reproduction.

The graphic communication system illustrated in FIG. 1 also includes a signalling and control system, constructed in accordance with the present invention, for controlling other operations of the receivers 11A and 11B. Thus, the transmitter 10 includes means for momentarily suppressing the output of either of the vertical and horizontal signal generators 26 and 29. This means includes a pair of push-button switches 42 and 43; the switch 42 is connected from the output of the "vertical" signal generator 26 to a plane of reference potential, here indicated as ground. Similarly, the switch 43 is connected from the output of the "horizontal" signal generator 29 to ground. Thus, closing of the switch 42 is effective to suppress the vertical signal component in the output of the transmitter 10, whereas closing of the switch 43 is effective to suppress the horizontal data signal which would otherwise normally be present in the composite signal transmitted to the receivers of the system. It should be understood that other devices can be utilized for this purpose; the switches 42 and 43 merely represent a simplified means for selectively suppressing one or the other of the data signals in the transmitter output.

The receiver 11A, on the other hand, is modified to include a control circuit 44. Control circuit 44 is coupled to the output of the vertical amplifier 38 and may also be coupled to the output stage of the horizontal amplifier 37. The control circuit is also coupled to the input circuits of the two amplifiers in a manner described in detail hereinafter in connection with FIG. 2. It is the circuit 44 which comprises the primary operating apparatus of the present invention, being utilized to control operation of the receiver 11A in accordance with the presence or absence of particular data signals in the composite signal received from the transmitter 10 over the transmission line 32. The receiver 11B, on the other hand, may be essentially similar to the receiver 11A and may include a control circuit similar to the circuit 44, as explained more fully hereinafter.

Figure 2:
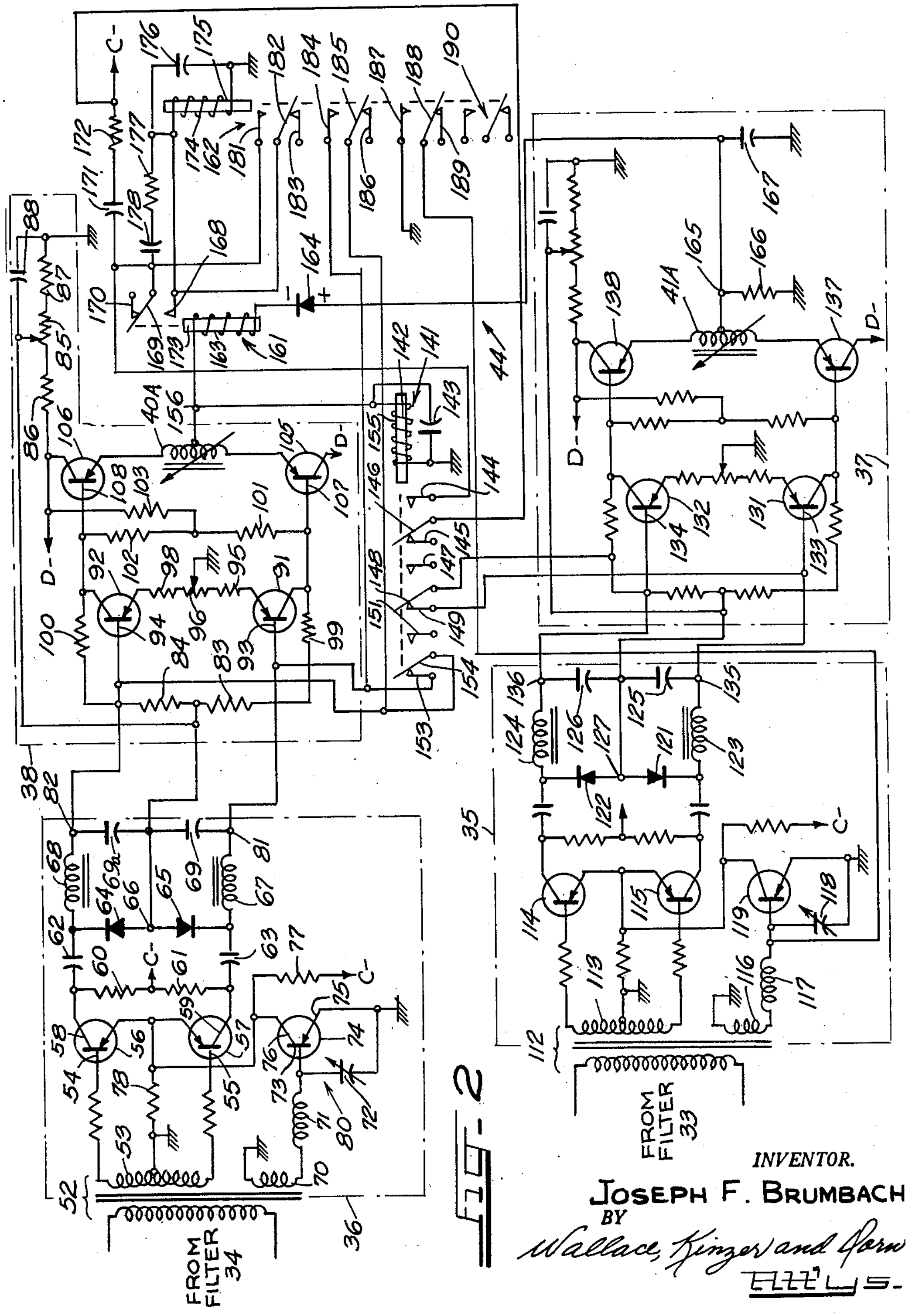
FIG. 2 is a detail schematic diagram of a signalling and control system for a graphic communication receiver constructed in accordance with one embodiment of the invention.

FIG. 2 illustrates, in substantial detail, the two discriminator circuits 35 and 36, the amplifier circuits 37 and 38, and the control circuit 44 for the receiver 11A. Thus, and as shown in FIG. 2, the discriminator circuit 36 may comprise an input transformer 52 having a primary winding which is coupled to the filter 34 (see FIG. 1). The transformer 52 is provided with a secondary winding 53, the winding 53 having a center tap which is returned to a plane of reference potential here indicated as ground. The end terminals of the secondary winding 53 are coupled, through current-limiting resistors, to the base electrodes 54 and 55 of a pair of transistors 56 and 57, respectively. Thus, the input circuit of the discriminator 36 applies a received signal from the filter 34 to the transistors 56 and 57 in push-pull relationship.

The collector electrode 58 of the transistor 56 is connected through a load resistor 60 to a source of unidirectional operating potential, herein designated as C−. The negative operating source is utilized with PNP transistors; if NPN transistors are employed, it is of course necessary to reverse the polarity of the operating source. Similarly, the collector electrode 59 of the other discriminator transistor 57 is connected through a load resistor 61 to the C− supply. The collector electrodes 58 and 59 are also connected to a pair of coupling capacitors 62 and 63, following which a pair of diodes 64 and 65 are connected across the two branches of the discriminator circuit. The diodes 64 and 65 form a part of a D.C. restoration circuit as explained more fully hereinafter. The diodes 64 and 65 are connected together at a terminal 66 which comprises the electrical center point of the discriminator. The output of the discriminator 36 comprises a low-pass filter including a pair of inductance coils 67 and 68 connected in the opposite sides of the push-pull circuit and a pair of capacitors 69 and 69*a* which are connected from the two sides of the circuit back to the electrical center point 66.

The input circuit of the discriminator 36 further includes an additional secondary winding 70 on the transformer 52. One terminal of the winding 70 is grounded and the other terminal is connected to an inductance coil 71. The inductance coil 71 is returned to ground through a variable capacitor 72, the common terminal of the coil 71 and the capacitor 72 being connected to the base electrode 73 of a transistor 74. The emitter 75 of the transistor 74 is grounded. The collector 76 of this transistor is connected to a voltage divider comprising a pair of resistors 77 and 78 connected between the C— supply and ground. The collector 76 is also connected to the emitter electrodes of the two discriminator transistors 56 and 57.

The discriminator 36 is essentially similar to the discriminator circuits described and claimed in the co-pending application of Myron L. Anthony, Serial No. 701,282, filed December 2, 1957; accordingly, only a brief description of the operation of this circuit is deemed necessary herein. Thus, the vertical-frequency data signal from the transmitter 10 (FIG. 1) is segregated from the horizontal data signal by the filter 34 and is applied to the input transformer 52 of the discriminator. The vertical data signal is supplied to the two transistors 56 and 57 in push-pull relationship, so that these two transistors tend to conduct in alternation with each other. The remaining portion of the input circuit, comprising the winding 70 and the transistor 74, is utilized to apply the received signal in push-push relation to the discriminator transistors 56 and 57, but with a phase shift which depends upon the frequency of the applied signal. That is, the circuit components 71 and 72 are adjusted to afford a circuit resonant at the center frequency of the vertical data signal, and the signal supplied to the emitter electrodes of the transistors 56 and 57 at this frequency is shifted 90° in phase as compared with the push-pull signal supplied to the base electrodes of the discriminator transistors. Whenever the input signal frequency changes to any substantial extent, however, the amount of phase shift provided by the circuit 80 changes, with the result that the normal balanced output of the discriminator becomes unbalanced. As described in the aforementioned application of Myron L. Anthony, the average output across the terminals 81 and 82 of the discriminator 36 is determined by the changes in frequency of the signal supplied to the discriminator and is an essentially linear function of the input signal frequency, over a substantial range.

The output terminals 81 and 82 of the discriminator 36 are connected to a pair of load resistors 83 and 84 which are returned to the center terminal 66 of the discriminator. The center terminal 66 of the resistor is also connected to a potentiometer 85 which is connected in series with a pair of resistors 86 and 87 between a negative polarity D.C. source D— and ground. This circuit is utilized to afford a reference potential to the terminal 66 and thus forms, with the diodes 64 and 65, a D.C. restoration circuit for the output of the discriminator 36. The center terminal 66 of the discriminator may also be by-passed to ground for A.C. through a capacitor 88.

The amplifier 38 is a push-pull circuit comprising two stages. The first stage of the amplifier includes a pair of transistors 91 and 92; the base electrode 93 of the transistor 91 is connected to the output terminal 81 of the discriminator whereas the base electrode 94 of the transistor 92 is connected to the discriminator output terminal 82. The emitter of the transistor 91 is returned to ground through a circuit comprising a resistor 95 and a potentiometer 96, whereas the emitter of the transistor 92 is returned to ground through a similar circuit comprising a resistor 98 and the potentiometer 96. The collector electrodes of transistors 91 and 92 are connected back to the base electrodes thereof by individual biasing resistors 99 and 100, respectively. The collector electrodes are also connected to the D— supply through a circuit comprising two individual load resistors 101 and 102 and a common resistor 103.

The second stage of the amplifier 38 comprises two transistors 105 and 106. The base electrode 107 of the transistor 105 is connected to the collector of the transistor 91 in the preceding stage. Similarly, the base electrode 108 of the transistor 106 is connected to the collector of the transistor 92. The collector electrodes of the second stage transistors are each directly connected to the D— supply. The transistors 105 and 106 are connected as emitter followers, the load for this stage of the amplifier being connected in the emitter circuits of the two transistors. In this instance, the load comprises the main winding 40A of a servo motor; thus, the winding 40A may be considered to be the main winding of the motor 40 in the system illustrated in FIG. 1.

The "horizontal" data control circuit of the receiver, as illustrated in FIG. 2, is essentially similar to the "vertical" circuit described hereinabove. Thus, the discriminator 35 is essentially similar in construction to the discriminator 36. The discriminator 35 includes an input transformer 112 having a primary winding connected to the filter 33 in the horizontal circuit (see FIG. 1). A center-tapped secondary winding 113 on the input transformer is connected to a pair of transistors 114 and 115, being connected to the base electrodes of the transistors in a push-pull input circuit. The discriminator 35 also includes a phase-shifting circuit similar to the circuit 80 and comprising a secondary winding 116 on the transformer 112 that is coupled to the transistors 114 and 115 through an operating circuit which includes a resonant circuit 117, 118 and a gate transistor 119. The discriminator 35 is provided with a D.C. restoration circuit comprising a pair of diodes 121 and 122; it also includes a low-pass filter circuit comprising a pair of inductances 123 and 124 and two capacitors 125 and 126. As before, the center point or terminal 127 in the output of the discriminator is connected back to the D.C. supply D— through a suitable circuit essentially similar to the circuits 85—88 described hereinabove.

The "horizontal" amplifier 37 is essentially identical with the "vertical" amplifier 38. The first stage of the horizontal amplifier 37 comprises a pair of transistors 131 and 132 having their base electrodes 133 and 134 connected to the output terminals 135 and 136, respectively, of the discriminator 35. The second stage of the amplifier 37, compirsing two transistors 137 and 138, is connected to the first stage in the same manner as in the amplifier 38. Again, the final stage of the amplifier is essentially an emitter follower of push-pull configuration, the emitter electrodes of the output transistors 137 and 138 being connected to the end terminals of a motor winding 41A. The coil 41A represents a main winding of the horizontal servo motor 41 of FIG. 1.

The control circuit 44, in the embodiment shown in detail in FIG. 2, comprises three control relays. The first control relay 141 has an operating coil 142 that is connected from a center tap on the motor winding 40A to ground. Preferably, a capacitor 143 is connected in parallel with the relay coil 142.

The relay 141 is provided with three sets of operating contacts. The first set of contacts includes a pair of fixed contacts 144 and 145 engageable with a movable contact 146. When the relay is in its unenergized or unactuated condition, as illustrated, the contacts 145 and 146 are engaged; actuation of the relay is effective to open these contacts and to close the contact 146 with the contact 144. The second set of contacts includes a normally open fixed contact 147, a normally closed fixed contact 149, and a movable contact 148. The contacts 148 and 149 are connected to the base electrodes 134 and 133 of the transistors 132 and 131 in the first stage of the amplifier 37. The third set of contacts in the relay 141 includes a normally open fixed contact 151, a normally closed fixed contact 153 and a movable contact 154. The relay contacts 153 and 154 are connected to the base electrodes 93 and 94, respectively, in the initial stage of the vertical amplifier 38. The movable contacts 146, 148 and 154 of the relay are, of course, mechanically connected to the armature 155 of the relay.

The control relay 141, although it forms a part of the complete control circuit 44, can also be used independently of the remainder of the control circuit to perform certain control functions in the operation of the receiver. In considering operation of this portion of the control circuit, it may first be assumed that the receiver 11A (FIG. 1) is conditioned for operation, with all power supplies energized, but with no signal input from the transmission line or other transmission link 32. Under these conditions, the center terminal 156 of the motor winding 40A is maintained at a constant voltage determined by the circuit parameters and the supply voltages employed. The circuit is constructed to prevent actuation of the relay 141 in response to this steady state voltage, which may be adjusted to a limited extent by adjustment of the potentiometer 85. In this regard, it should be noted that the voltage conditions at the terminal 156 are directly representative of and correspond to the voltage at the center terminal 66 of the discriminator 36, due to the balanced configuration of the circuit. That is, although the voltage at the terminal 156 may be specifically different from the voltage at the terminal 66, potential changes at these two terminals follow each other and are proportional to each other. In a typical circuit arrangement, using the parameters set forth in detail hereinafter, the terminal 156 may be maintained at approximately −2 volts with respect to ground when there is no incoming vertical-frequency data signal.

Thus, with no received signal, and particularly no received vertical-frequency data signal, the relay 141 remains in the unactuated condition illustrated in FIG. 2. The base electrodes 93 and 94 in the first stage of the vertical amplifier 38 are shorted through the relay contacts 153 and 154. Similarly, the base electrodes of the first stage transistors 131 and 132 in the amplifier 37 are shorted through the relay contacts 148 and 149. This being the case, no differential current is applied to either of the motor windings 40A and 41A, although some steady-state current may follow in balanced relation through each of the two windings. Under these circumstances, no corrective servo currents flow in the motors 40 and 41 so that the pen linkage or pantograph and the pen remain motionless.

The foregoing operational condition of the receiver 11A changes as soon as data signals are received from the transmitter 10. Thus, when the transmitter 10 is placed in operation, a vertical-frequency data signal is supplied to the discriminator 36 from the filter 34 and a horizontal-frequency data signal is supplied to the discriminator 35 from the filter 33. With reference to FIG. 2, when this occurs the potential at the discriminator output terminals 81 and 82 changes to a substantial extent and in the same direction, even though the received signal may be unmodulated and hence may not produce any substantial push-pull signal at these terminals. That is, with a balanced discriminator circuit such as the discriminator 36, energization of the discriminator with a signal within the normal operating range of the discriminator effects a substantial change in the operating potential of the terminals 81 and 82 with respect to ground even though there is no substantial relative potential difference between terminals 81, 82 comparing one with the other.

A corresponding change occurs in the operating potential of the center tap 156 in the output of the amplifier 38, as noted hereinabove. Thus, when a vertical-frequency data signal is received, the two first-stage transistors 91 and 92 of the amplifier 38 are both driven less conductive, and this in turn drives the second-stage transistors 105 and 106 more conductive. Accordingly, even if the received signal is in exact correspondence with the center frequency used for the vertical data signal, and there is no differential current supplied to the motor winding 40A, a greater total current flows in the output circuit of the amplifier 38 and hence in the winding 40A. In a typical circuit arrangement, the voltage at the control terminal 156 may go from a value of −2 volts relative to ground, as noted hereinabove, to a potential of say −6 volts with respect to ground depending upon the input signal level of the discriminator. Furthermore, this operating potential will be maintained as long as an input signal of the same amplitude level is present.

This change in potential is sufficient to actuate the relay 141, opening the contacts 148, 149 and the contacts 153, 154. Accordingly, actuation of the relay 141 effectively opens the shorting connections in the input stages of the amplifiers 37 and 38, permitting both amplifiers to function in normal manner with respect to push-pull signals. During normal signal transmission, of course, differential currents are developed in the two halves of the motor winding 40A, since this is necessary for effective operation of the motor. These differential currents effectively compensate each other, however, the total current through the two halves of the motor winding and the terminal 156 remaining essentially constant. Accordingly, the potential at the terminal 156 does not change substantially in response to changes in the push-pull signal supplied to the amplifier 38 from the discriminator 36 and the relay 141 is maintained in actuated condition until such time as transmission is interrupted and a vertical-frequency signal is no longer available at the input to the discriminator 36. When signal transmission is interrupted, the circuit returns to the initial operating conditions set forth hereinabove, the relay 141 is de-energized, and the input circuits of the two amplifiers 37 and 38 are again shorted out.

As noted hereinabove, the operating potential at the terminal 156 effectively "follows" the in phase potential change of terminals 81 and 82 of the discriminator 36. Accordingly, it is seen that the control relay 141 could be connected directly to the discriminator and would operate in the same manner as described hereinabove; the connection illustrated in FIG. 2 is utilized only because it is somewhat more convenient with respect to obtaining a relatively low operating potential for the normal or unactuated state of the relay. Thus, to all intents and purposes the relay 141 is actuated in accordance with changes in the potential at electrical center point of the discriminator. Stated differently, the push-pull circuit 38 may be considered as an extension of and a part of the balanced discriminator circuit 36; the relay 141 may be connected to the electrical center of the circuit at any stage where a push-push signal change occurs in response to the absence or presence of a signal within the normal frequency range of the discriminator.

From the foregoing description, it is seen that the control relay 141 affords a control circuit which is responsive to a received data signal and which is effective to actuate the receiver from a non-operating to an operating condition. No separate control signal is necessary for this purpose. Consequently, it is possible to maintain the receiver 11A energized and connected to the transmission line at all times, even though an operator is not present. The receiver pen is not driven through undesired movements in response to extraneous noise or other undesirable signals occurring in the system unless, of course, such signals correspond to the vertical-frequency data control signals and are of substantial duration.

The control circuit 44 also includes the two relays 161 and 162. One terminal of the operating coil 163 for the relay 161 is connected to the center tap 156 on the motor winding 40A. The other terminal of the relay coil 163 is connected through a diode 164 to a center tap 165 on the other motor winding 41A. A load resistor 166 is connected from the terminal 165 to ground, the resistor 166 being by-passed by a capacitor 167.

The relay 161 includes a normally open fixed contact 168 which is engageable with a movable contact 169, the contact 169 normally being closed on a second fixed contact 170. The contact 170 is open-circuited, whereas the movable contact 169 is connected to the normally open fixed contact 144 of the control relay 141. The movable contact 169 is also returned to the C— supply through a circuit comprising, in series, a blocking capacitor 171 and a discharge resistor 172. The mating contact for contact 144 of the relay 141, the movable contact 146, is directly connected to the C— supply. The movable contact 169 is, of course, mechanically connected to the armature 173 of the relay 161.

The relay 162 comprises an operating coil 174 and an armature 175. One terminal of the coil 174 is connected to the normally open fixed terminal 168 of the relay 161. The other terminal of the coil is returned to ground and a capacitor 176 is preferably connected in parallel with the relay coil. A timing circuit for the relay may be provided, and comprises a resistor 177 connected in series with a capacitor 178 between the ungrounded terminal of the coil 174 and the movable contact 169 of the relay 161.

The relay 162 includes four individual sets of contacts. The first set of contacts includes a normally open fixed contact 181 that is connected to the movable contact 169 of the relay 161. The movable contact 182 in this set is connected back to the fixed contact 168 of the relay 161, and hence is connected to the ungrounded terminal of the operating coil 174 of the relay 162. The normally closed fixed contact 183 associated with the movable contact 182 is left open-circuited.

In the second set of contacts for the relay 162, a normally open fixed contact 184 is connected to the base electrode 93 in the first stage of the amplifier 38. The movable contact 185 in this set is connected to the base electrode 94 in the first stage of the amplifier 38. The normally closed fixed contact 186 associated with the movable contact 185 is left open-circuited.

The third set of contacts in the relay 162 comprises a fixed normally open contact 187 which is grounded. A movable contact 188 is included in this set of contacts and is connected to the base electrode of the gate transistor 119 in the "horizontal" discriminator 35 of the receiver. The movable contact 188 is normally closed on a fixed contact 189 that is open-circuited. A fourth set of contacts 190 may be included in the relay 162 for auxiliary control purposes, no connections being shown in this set of relay contacts. The contacts 190 may be used to operate a signal lamp or other external signalling device, or for other purposes as desired.

By proper selection of the resistor 166 relative to the resistance of the relay operating coil 142, and by adjustment of the potentiometer 85 in the amplifier 38 and the corresponding potentiometer in the amplifier 37, the circuit of FIG. 2 may be adjusted to afford essentially equal potentials at the terminals 156 and 165 when there is no received signal from the transmitter 10. When properly adjusted, the circuit also provides substantially equal potentials at terminals 156 and 165 when both horizontal and vertical data signals are received. Thus, and with specific reference to the circuit of FIG. 2 using the circuit parameters set forth in detail hereinafter, the receiver may be adjusted to afford a low potential at each of the terminals 156 and 165, relative to ground, when no signal is received, and a substantially greater potential at both terminals when both vertical and horizontal data signals are received. Whenever there is no substantial potential difference between the terminals 156 and 165, the relay 161 is not energized. That is, the relay 161 remains unactuated when no signal is received from the transmitter 10 (FIG. 1) and also remains unenergized when both vertical and horizontal data signals are received from the transmitter, as is the case during normal operation of the receiver. Furthermore, as long as the relay 161 remains unenergized, the relay 162 must also remain unactuated, since the operating circuit for the relay coil 174 is open-circuited in the contacts of the relay 161.

In operation of the transmitter 10 (FIG. 1), it is possible to suppress the vertical data signal while maintaining transmission of the horizontal data signal. This may be accomplished by closing the push-pull switch 42, effectively shunting the output of the vertical signal generator 26 to ground. When this is done, the transmitter 10 continues to supply a horizontal data signal to the transmission line 32, and hence to the receiver 11A. As a consequence, the potential at the center terminal 156 of the amplifier 38 changes, as described hereinabove. That is, the potential at the terminal 156 reflects the absence of a vertical data signal in the vertical operating circuit 36, 38, whereas the potential at the terminal 165 is indicative of the presence of a horizontal data signal applied to the horizontal operating circuit 35, 37. By way of an example, the terminal 156, under these conditions, may be at approximately −2 volts relative to ground and the potential at the terminal 165 may be at approximately −6 volts with respect to ground. Accordingly, a substantial potential difference is established between the terminals 156 and 165. The diode 164, however, prevents any substantial current in this circuit, so that the control circuit 44 remains in its normal condition, and neither of the relays 161 or 162 is actuated.

It is thus seen that the suppression of the vertical data signal, in the transmission system of FIGS. 1 and 2, does not actuate the control system 44 insofar as continued operation of the receiver is concerned. A substantially different effect is obtained, however, if the horizontal data signal is suppressed. This may be accomplished, at the transmitter, by closing the switch 43 for a relatively short interval, thereby effectively shunting the output of the horizontal signal generator 29 to ground. Under these conditions, the transmitter 10 continues to supply a vertical data signal to the transmission line 32 and hence to the receiver 11A, but no horizontal data signal is transmitted. Under these conditions, the potentials at the terminals 156 and 165 are reversed as compared with the conditions described hereinabove; that is, the terminal 156 may be at approximately −6 volts and the terminal 165 at approximately −2 volts relative to ground. As a consequence, and since the diode 164 presents a small impedance to current of this polarity, the relay 161 is actuated, closing the contacts 168 and 169.

Because a vertical data signal is received, although the horizontal signal is suppressed, the relay 141 is actuated as well as the relay 161. Consequently, an energizing circuit is established for the relay 162, this circuit extending from the C— supply through the contacts 144 and 146 of the relay 141, the contacts 169 and 168 of the relay 161, and through the operating coil 174 of the relay 162 to ground. The closing of the contacts 181 and 182, occasioned by energization of the relay 162, establishes a holding circuit for the relay 162 which bypasses the contacts 168 and 169 of the relay 161. Consequently, it is not necessary to maintain suppression of the horizontal signal for more than a short interval in order to keep the relay 162 energized. That is, reestablishment of transmission of the horizontal signal does not cause the relay 162 to drop out.

The closing of the contacts 184 and 185 of the relay 162 establishes an effective short circuit across the two input electrodes 93 and 94 in the first stage of the vertical amplifier 38. Consequently, as long as the relay 162 remains energized, the amplifier 38 is effectively disabled for push-pull operation and no differential current is supplied to the servo motor winding 40A regardless of variations in the received vertical data signal. Closing of the contacts 187 and 188 of the relay 162, on the other hand, is effective to ground the base electrode of the transistor 119 in the quadrature circuit of the horizontal discriminator 35. Consequently, the horizontal operating circuit 35, 37 is also effectively disabled, with the result that the receiver does not perform a recording operation. During the remainder of the signal transmission, and despite the fact that the horizontal signal is restored, the receiver 11A does not record any data transmitted from transmitter 10.

In the transmission system illustrated in FIG. 1, as noted hereinabove, the receiver 11B may be essentially similar to the receiver 11A. For maximum flexibility, however, the receiver 11B should be constructed to maintain operation despite momentary suppression of the horizontal data signal but should be disabled upon momentary suppression of the vertical signal. Inasmuch as this change in control operation can be readily accomplished by reversing the connections of the control circuit 44 (FIG. 2), or by reversing the diode 164, no detailed illustration of the receiver 11B is provided in the drawings. Selection of a specific receiver or group of receivers in the system is effected by means of the data signals themselves, without requiring transmission of any separate control signals. Moreover, this is accomplished effectively and economically by utilizing the differences in push-pull and push-push operating characteristics of balanced operating circuits such as the discriminators and amplifiers described hereinabove in connection with FIG. 2.

With reference to the specific system of FIG. 2, it is of course necessary to provide some means to restore the receiver to operation. This is accomplished simply by interrupting transmission of both the vertical and horizontal data signals from the transmitter for a relatively short interval. When this is done, the relay 141 drops out, as described hereinabove, breaking the energizing circuit to the relay 162 at the contacts 144 and 146 of the relay 141. Consequently, the receiver can be automatically restored to operative condition by simple action at the transmitter, without transmission of a separate control signal, and without requiring attendance of an operator at the receiver.

In a typical system, the center frequency for the vertical and horizontal data signals may be selected to fall within the normal transmission range of conventional telephone systems in order to permit the use of telephone transmission lines by the system. For example, in one commercial system the vertical data signal frequency is 1400 cycles and the horizontal data signal frequency is 2200 cycles. These signal frequencies are not critical, however, and are determined primarily by the requirements of the transmission link over which the system must operate.

The circuit values for a substantial portion of the circuit of FIG. 2 are set forth in detail hereinafter. The data set forth are applicable to the vertical operating circuit comprising the amplifier 38 and a portion of the discriminator 36, as well as to the control circuit 44. Corresponding data have not been given for the horizontal operating circuit 35, 37 since these would be the same as for the vertical operating circuit except for the components of the filter in the output of the discriminator. It should be understood that these data are provided solely by way of illustration and in no sense as a limitation on the present invention.

| | |
|---|---|
| Transistors 93, 94 | 2N651 |
| Transistors 105, 106 | 2N669 |
| Diodes 64, 65, 164 | 1N2069 |
| Resistors 83, 84, 99, 100 ____ kilohms | 10 |
| Resistors 95, 98 ____ ohms | 180 |
| Potentiometer 96 ____ do | 250 |
| Resistors 101, 102 ____ kilohms | 1.2 |
| Resistor 103 ____ ohms | 470 |
| Resistor 86 ____ kilohms | 3.3 |
| Resistor 87 ____ do | 1.0 |
| Potentiometer 85 ____ do | 2.5 |
| Resistor 166 ____ ohms | 68 |
| Resistors 172, 177 ____ do | 22 |
| Capacitors 69, 70 ____ microfarads | 0.5 |
| Capacitors 143, 167 ____ do | 500.0 |
| Capacitors 171, 173 ____ do | 0.1 |
| Capacitor 175 ____ do | 5.0 |
| Relays 141, 162 ____ kilohms | 6 |
| Relay 161 ____ ohms | 150 |
| Inductances 67, 68 ____ henries | 5 |
| C— supply ____ volts | —45 |
| D— supply ____ do | —30 |

Figure 3:
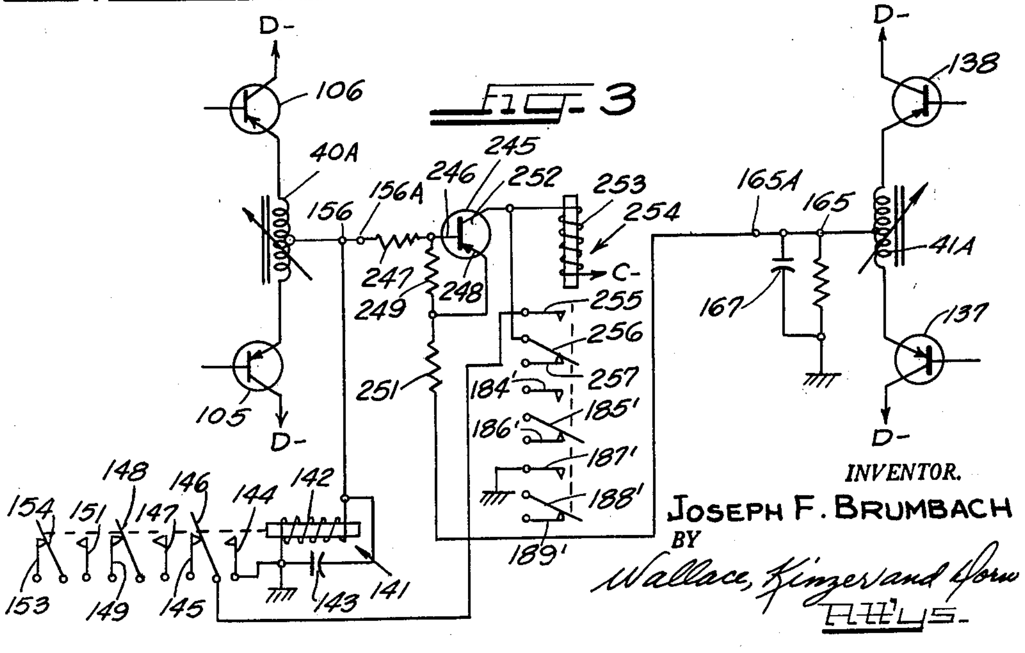
FIG. 3 illustrates a control arrangement comprising another embodiment of the present invention.

FIG. 3 illustrates another embodiment of the signalling and control system of the present invention, this embodiment being substantially similar to that of FIG. 2 in many respects. Thus, the basic horizontal and vertical data signal circuits may be essentially the same as shown in FIG. 2. Accordingly, only the final stage of the vertical amplifier, comprising the transistors 105 and 106 and the motor winding 40A, is shown in FIG. 3. In the same manner, the illustration of the horizontal amplifier is restricted, in FIG. 3, to the transistors 137 and 138 in the final stage thereof and the motor winding 41A. The relay 141 of the control circuit is connected to the vertical amplifier, and specifically the terminal 156, in the same manner as in FIG. 2. That is, the operating coil 142 of the relay is connected from the terminal 156 to ground and, as before, is by-passed by the capacitor 143. Except for a minor change in the connections to contacts 144—146, described hereinafter, the connections to the contacts of the relay 141 remain unchanged.

The receiver switching arrangement in FIG. 3 is substantially different, however, from that of FIG. 2. Thus, the control circuit 244 comprises a transistor 245 having a base electrode 246 that is connected to the terminal 156 of the vertical data signal amplifier through a resistor 247. The emitter 248 of the transistor is returned to the base electrode 246 through a bias resistor 249. The emitter 248 is also connected to the center terminal 165 of the horizontal data amplifier through a resistor 251. As in the circuit of FIG. 2, the terminal 165 is returned to ground through the resistor 166, which is by-passed by the capacitor 167.

The collector electrode 252 of the transistor 245 is connected to one end of the operating coil 253 of a control relay 254, the other end of the operating coil being connected to the C— supply. The relay 254 comprises a first set of contacts including a normally open fixed contact 255 engageable with a movable contact 256 that is normally closed upon a fixed contact 257. The contact 255 is left open-circuited and the movable contact 256 is connected back to the collector electrode 252. The normally closed fixed contact 257 is connected to the movable contact 146 of the control relay 141. In this embodiment, unlike that of FIG. 2, the normally open fixed contact 144 of the relay 141 is grounded.

The relay 254 further includes two additional sets of contacts corresponding to the second and third sets of contacts of the control relay 162 in the embodiment of FIG. 2. These contacts are indicated by the reference numerals 184′ through 189′ and correspond to the contacts 184 through 189, respectively, of the control circuit 44 in the previously described embodiment. The connections from these relay contacts to the vertical and horizontal operating circuits of the receiver are the same as shown in FIG. 2 and have not, therefore, been repeated in FIG. 3.

Although the circuit of FIG. 3 is quite different in construction, it operates in essentially the same manner as the circuit of FIG. 2 except that the embodiment of FIG. 3 is arranged for actuation in response to suppression of the vertical data signal rather than the horizontal data signal. Thus, in normal operation of the receiver in which the control circuit 244 is incorporated, the relay 141 is energized whenever a vertical data signal is received. This relay performs the same essential function as in the previously described embodiment. As long as both vertical and horizontal data signals are received, the relay 254 remains unactuated because the transistor 245 is biased to be substantially non-conductive or at least to conduct a current limited to a value below the threshold current for the relay. If the horizontal signal is suppressed, a voltage difference is established between the terminals 156 and 165, as noted hereinabove. However, this operating potential, as applied to the transistor 245, tends to drive the transistor in the reverse direction, so that the relay 254 remains unactuated.

Suppression of the vertical data signal, on the other hand, establishes a potential difference between the terminals 156 and 165 which is effective to drive the transistor 245 in the forward direction, increasing conductivity of the transistor. As a consequence, the relay 254 is energized and actuated through an operating circuit comprising the source C—, the operating coil 253, the collector-emitter circuit of the transistor 245, and the resistors 251 and 166, the resistor 166 being returned to ground. Actuation of the relay 254 is effective to disable the receiver, with respect to a recording operation, in the same manner as effected by actuation of the relay 162 in the embodiment of FIG. 2.

When the vertical signal is restored, the original energizing circuit for the relay 254 comprising the transistor 245 is effectively opened, since the transistor returns to its initial relatively non-conductive state. However, the circuit of FIG. 3 is constructed to provide for closing of the relay 141 before the relay 254 drops out. Consequently, a new energizing circuit is established for the relay 254, this circuit beginning at the C— supply and extending through the relay coil 253, the contacts 255 and 256 (previously closed upon initial actuation of the relay 254) and through the contacts 144 and 146 of the relay 141 to ground. Accordingly, even though the vertical signal is suppressed only for a relatively short time, the relay 254 remains actuated during the desired interval in which data are transmitted only to other receivers of the system.

Restoration of the receiver in which the control circuit of FIG. 3 is incorporated to normal operation is effected in the same manner as in the embodiment of FIG. 2. Thus, if transmission from the transmitter 10 is interrupted completely at any time, the relay 141 drops out. With both vertical and horizontal signals interrupted, there is no substantial potential difference between the terminals 156 and 165, so that the relay 254 cannot be energized through the transistor 245. Accordingly, the relay 254 drops out and the receiver is restored to normal operating condition.

As noted hereinabove, FIG. 3 is connected for "vertical suppression" operation as contrasted with the "horizontal suppression" operation of the embodiment of FIG. 2. Conversion of the circuit 244 to "horizontal suppression" operation can be effected quite simply. Thus, the circuit illustrated in FIG. 3 is disconnected at the point 156A and the resistor 247 is connected to the terminal 165 instead of the terminal 156. In addition, a disconnection is effected at the point 165A and the resistor 251 is returned to the terminal 156 instead of the terminal 165. With this change, the control circuit 244 is effective to block operation of the receiver in response to momentary suppression of the horizontal data signal, maintaining operation under other circumstances including suppression of the vertical signal.

Hence, while preferred embodiments of the invention have been described and illustrated, it is to be understood that they are capable of variation and modification.

I claim:

1. A signalling and control system for a receiver in a graphic communication system of the kind in which reproduction data are transmitted to the receiver as a frequency-modulated signal restricted to a given frequency range, comprising: control circuit means for the receiver including an operating circuit and data signal detector means having a balanced discriminator circuit with an electrical center point for developing control signals in the form of push-pull signal variations of the modulated data signal relative to said electrical center point of said discriminator circuit, the potential at said center point changing with the amplitude of the modulated data signal regardless of amplitude changes in the push-pull control signal output of said detector means; and a control device, effectively connected to said electrical center point and having means actuatable between a first operating condition and a second operating condition in response to predetermined changes in the potential of said electrical center point, said control device when in its said second operating condition enabling the receiver for operation by the push-pull signal output of said detector means.

2. A signalling and control system for a receiver in a graphic communication system of the kind in which coordinate graphic reproduction data are transmitted and applied to the receiver as a pair of frequency modulated signals of substantially different frequency, comprising: control means having data signal detector means including a pair of balanced circuit means, each with an electrical center point and each effective to develop push-pull signal variations of the modulated data signal relative to the said electrical center point thereof, the potential at said center point in each circuit means changing with the amplitude of the modulated data signal impressed thereon regardless of amplitude changes in the push-pull signal variations developed by that circuit means; a control device, connected between the electrical center points of both said circuit means, and actuatable between a first operating condition and a second operating condition in response to predetermined changes in the relative potential between said electrical center points as effected by the presence of one of said data signals at one of said center points and the absence of the other data signal at the other said center point, and means, connected to said control device, for effectively preventing operation of the receiver whenever said control device is in its said second operating condition and operative to maintain said control device in its said second operating condition even though data signals are thereafter restored to both said center points.

3. A receiver for a graphic communication system of the kind in which reproduction data are transmitted as a pair of frequency modulated data signals of different frequency, comprising: graphic reproduction apparatus; a pair of push-pull data control circuits for controlling said apparatus, each comprising detector means including a balanced operating circuit means for developing a control signal representative of one of said signals, in the form of push-pull signal variations of the latter relative to an electrical center point of its said operating circuit means, the potential at said center point charging with the amplitude of said one data signal regardless of amplitude changes in the push-pull signal output of said detector means; first control means connected to the electrical center point of one of said operating circuit means and actuatable between a first operating condition and a second operating condition in response to changes in the potential of said electrical center point effected by a change in amplitude of a given one of said data signals; second control means, connected to the electrical center points of said operating circuit means in both said control circuits and actuatable from a first operating condition to a second operating condition in response to a differential in the potentials between said center points effected by the presence of a first selected one of said data signals at a selected one of said center points and the absence of the other data signal at the other center point; and means for interrupting push-pull operation of both of said data control circuits in response to actuation of either of said control means to one of its operating conditions.

4. A receiver for a graphic communication system of the kind in which reproduction data are transmitted as a pair of frequency modulated data signals of different frequency, comprising: graphic reproduction apparatus; a pair of data control circuits each comprising signal detector means including balanced circuit means for detecting a received data signal and developing a control signal therefrom representative of one of said data signals, in the form of push-pull signal variations of the latter relative to an electrical center point of its said circuit means, the potential at said center point changing with the amplitude of said one data signal regardless of amplitude changes in the push-pull signal output of said detector means; first control means connected to the electrical center point of one of said circuit means, and actuatable between a first operating condition and a second operating condition in response to changes in the potential of said electrical center point effected by a change in amplitude of a given one of said data signals; second control means, connected to the electrical center points associated with both of said data control circuits and actuatable from a first operating condition to a second operating condition in response to a differential in the potentials therebetween effected by the presence of a first selected one of said data signals at a selected one of said center points and the absence of the other data signal at the other said center point; means for interrupting push-pull operation of both of said data control circuits in response to actuation of either of said control means to a selected one of its operating conditions; and a holding circuit means, connected to said second control means, for maintaining said selected one control means in its second operating condition, despite restoration of said other data signal, until both of said data signals are interrupted.

5. In a graphic communication receiver comprising a graphic reproduction apparatus and a pair of receiver operating circuit means for applying signals to the receiver and for actuating said apparatus to reproduce data in response to a received signal which includes a pair of frequency modulated data signals, a control circuit comprising: a pair of detector means, individually connected to said operating circuit means, each for detecting a change in amplitude of one of said data signals, independently of the frequency modulation thereof; first control means, connected to a given one of said detector means and to said operating circuit means, for maintaining said reproduction apparatus in a non-operating condition to prevent data reproduction thereby whenever a given one of said data signals is not detected, and for restoring said reproduction apparatus for normal operation whenever said one data signal is detected; and second control means, connected to both of said detector means and to both said operating circuit means, for establishing said reproduction apparatus in said non-operating condition to prevent data reproduction thereby whenever said given one of said data signals is detected and the other is undetected, said second control means including holding means for maintaining said reproduction apparatus in said non-operating condition, despite restoration and detection of said other data signal, until reception of both data signals is interrupted.

6. In a graphic communication receiver comprising a graphic reproduction apparatus and a pair of receiver operating circuits for applying signals to the receiver and actuating said apparatus to reproduce data in response to a received signal which includes a pair of frequency modulated data signals, a control circuit comprising: a pair of detector means, each for detecting a change in amplitude of one of said data signals, independently of the frequency modulation thereof; and control means, coupled to both of said detector means and to said operating circuits, for establishing said reproduction apparatus in a non-operating condition to prevent data reproduction thereby whenever only a selected one of said data signals is detected in the received signal and the other is undetected, said control means including holding means for maintaining said reproduction apparatus in said non-operating condition, despite subsequent detection of said undetected data signal, until reception of both data signals is interrupted.

7. In a graphic communication receiver comprising a graphic reproduction apparatus having a pair of balanced operating circuit means, each with an electrical center point, for applying signals to the receiver and for actuating said apparatus to reproduce data in response to a received signal which includes a pair of frequency modulated data signals, a control circuit comprising: a control relay connected to the electrical center point of one of said balanced operating circuit means and actuatable between first and second operating conditions in response to a signal developed at said center point indicative of the presence of a given one of said data signals; and control means, comprising circuit means connecting said relay to both said operating circuit means for maintaining said reproduction apparatus in a non-operating condition to prevent data reproduction thereby whenever said one data signal is absent from the received signal.

8. In a graphic communication receiver comprising a graphic reproduction apparatus and a pair of balanced amplifier circuits presenting electrical center points for applying signals to the receiver and actuating said apparatus to reproduce data in response to a received signal which includes a pair of frequency modulated data signals, a control circuit comprising: a control relay; a polarity sensitive energizing circuit, connected to said relay and to the electrical center points of said balanced amplifier circuits, to actuate said relay from an initial condition to an actuated condition in response to a potential difference of given polarity between said center points indicative of a change in amplitude of one of said data signals; control means, comprising a circuit coupling said relay to said amplifier circuits, for maintaining said reproduction apparatus in a non-operating condition to prevent data reproduction thereby whenever said relay is in said actuated condition; and holding circuit means for maintaining said relay in said actuated condition, regardless of restoration of the potential balance between said center points until reception of both data signals is interrupted.

9. The combination as set forth in claim 2 including means for restoring said control device to its first operating condition.

10. A signalling and control system for a receiver in a graphic communication system of the kind in which reproduction data are transmitted as a frequency modulated signal having a selected frequency range, comprising: control means coupled to the receiver for applying signals thereto and including signal detector means and at least one balanced operating circuit means therefor having an electrical center point for detecting incoming data signals and for developing receiver control signals therefrom in the form of push-pull variations of the detected data signals, said variations being developed relative to the electrical center point of the operating circuit, the potential at said center point changing with the amplitude of the modulated data signal received by said detector means without regard to amplitude changes in the push-pull control signals developed by said detector means; and a control device, connected in circuit with said electrical center point and including means actuatable between a first operating condition and a second operating condition in response to predetermined amplitude changes of the modulated data signal to thereby enable the receiver for operation by and in accordance with the push-pull control signals developed by said detector means.

11. In a graphic communication receiver comprising a graphic reproduction apparatus and a pair of operating circuit means for applying signals to the receiver from a data signal transmitter whereby to actuate said apparatus to reproduce data in response to a received signal which includes a pair of frequency modulated data signals, a control circuit comprising: means, connected to at least one of the operating circuit means for detecting the presence of a given one of said data signals applied thereto; and control means, connected to said signal detecting means and to said pair of operating circuit means, for maintaining said reproduction apparatus inoperative until said one data signal is detected by said signal detecting means.

12. A signalling and control system for a receiver in a graphic communication system of the class in which coordinate reproduction data are transmitted to the receiver as a frequency modulated data signal of given frequency range, comprising: means for detecting data signals transmitted to the receiver including circuit means for developing control signals therefrom to be applied to the receiver, said control signals comprising push-pull variations of the detected data signal; the said circuit means being balanced and having an electrical center point whose potential changes with the amplitude of the detected data signal independently of the amplitude changes of the said control signals; and a control device, effectively connected to said electrical center point of said circuit means and including means actuatable in response to predetermined changes in the potential of said electrical center point to condition the receiver for actuation in accordance with the control signals applied thereto from said circuit means.

References Cited in the file of this patent

UNITED STATES PATENTS

| | | |
|---|---|---|
| 2,094,052 | Aamodt | Sept. 28, 1937 |
| 2,923,770 | Lally | Feb. 2, 1960 |